(12) United States Patent
Shervey

(10) Patent No.: US 10,526,001 B2
(45) Date of Patent: Jan. 7, 2020

(54) SLEIGH BED

(71) Applicant: Paul Douglas Shervey, Bloomington, MN (US)

(72) Inventor: Paul Douglas Shervey, Bloomington, MN (US)

(*) Notice: Subject to any disclaimer, the term of this patent is extended or adjusted under 35 U.S.C. 154(b) by 0 days.

(21) Appl. No.: 15/998,233

(22) Filed: Apr. 27, 2017

(65) Prior Publication Data

US 2019/0135324 A1    May 9, 2019

(51) Int. Cl.
*B62B 13/06* (2006.01)
*B62B 15/00* (2006.01)
*A01K 97/01* (2006.01)

(52) U.S. Cl.
CPC .............. *B62B 13/06* (2013.01); *A01K 97/01* (2013.01); *B62B 15/007* (2013.01)

(58) Field of Classification Search
CPC ......... B62B 13/06; B62B 13/02; B62B 13/00; B62B 15/007; A01K 97/01
USPC ...................................... 280/18, 19
See application file for complete search history.

(56) References Cited

U.S. PATENT DOCUMENTS

| 3,693,849 | A | * | 9/1972 | Knabenbauer | A45F 3/08 224/153 |
| 4,347,635 | A | * | 9/1982 | Eisenhauer | A47C 1/143 280/18 |
| 6,066,016 | A | * | 5/2000 | Yonover | B63C 9/04 235/379 |
| 6,641,446 | B1 | * | 11/2003 | Bentley | B62B 13/06 280/19 |
| 9,487,226 | B2 | * | 11/2016 | Coates | B62B 17/061 |
| 2004/0217563 | A1 | * | 11/2004 | Butts, Jr. | B62B 15/00 280/18 |

* cited by examiner

*Primary Examiner* — John D Walters

(57) ABSTRACT

The sleigh bed platform is intended for use in ice fishing for transport of equipment such as a tent shelter and sized to accommodate a single reclining person for rest on the ice. Sleigh bed invention is very light easy to pull across thin ice. Three laminated plastic layers with a inner component of expanded polystyrene form a rigid truss and thermal barrier that makes the sleigh bed a comfortable resting place. Expanded polystyrene is insulation and extremely buoyant providing a float in cases of breaking thru lake ice. Multiple soft rope handles secure loads with no sharp edges around the bed. A second invention use is for evacuation of injured skiers. Lightweight sleigh bed is easy to carry to an injured skier. A rigid front handle facilitates moving down hill with a passenger secured to the sleigh bed.

2 Claims, 3 Drawing Sheets

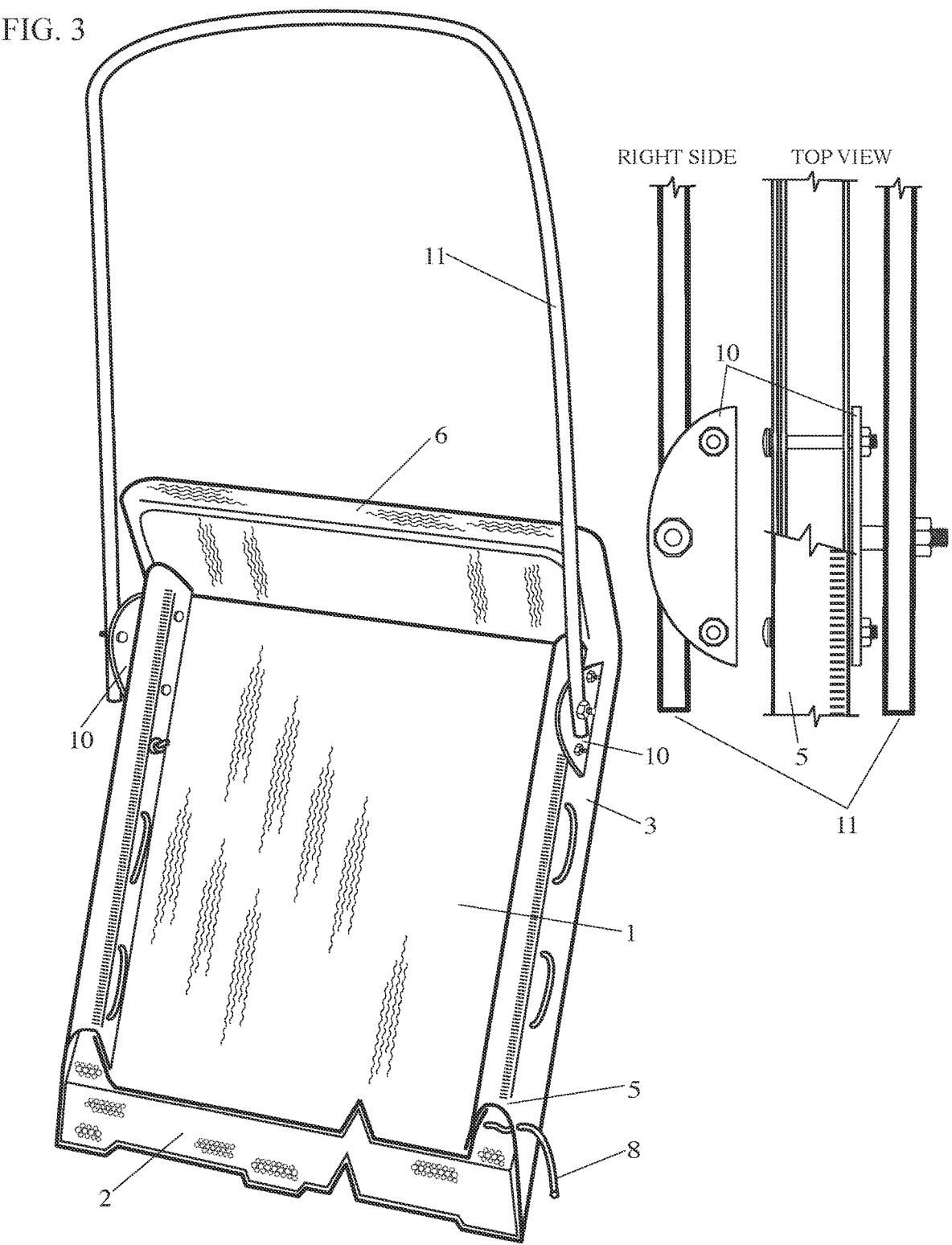

SLEIGH BED

Sled or sleigh bed platform of rigid strength to provide transport for equipment or a person fully reclined over land, snow and ice. Due to the embodiment of materials and simplicity of construction the platform is very light weight and easily carried by hand or pulled by handle, cable or rope. Sleigh bed edges include a plurality of thru holes with rope laced into them to provide numerous hand holds and tethering loops. Elastic cords or bungee straps may hook on these lopes holding equipment or incapacitated person in place. High thermal resistance of the sleigh bed reflects body heat of a person sitting or reclining to enhance comfort. Diagonal front or plow edge and runners the length of the platform sides and in the center of the breadth facilitate ease of moving the sleigh bed over natural terrain including soil, grass, snow and ice.

BRIEF DESCRIPTION OF DRAWINGS

FIG. 3 SLEIGH BED rigid front handle with side and top view of connections.

DESCRIPTION AND UNIQUE CHARACTERISTICS

FIG. 1

Figure 1:
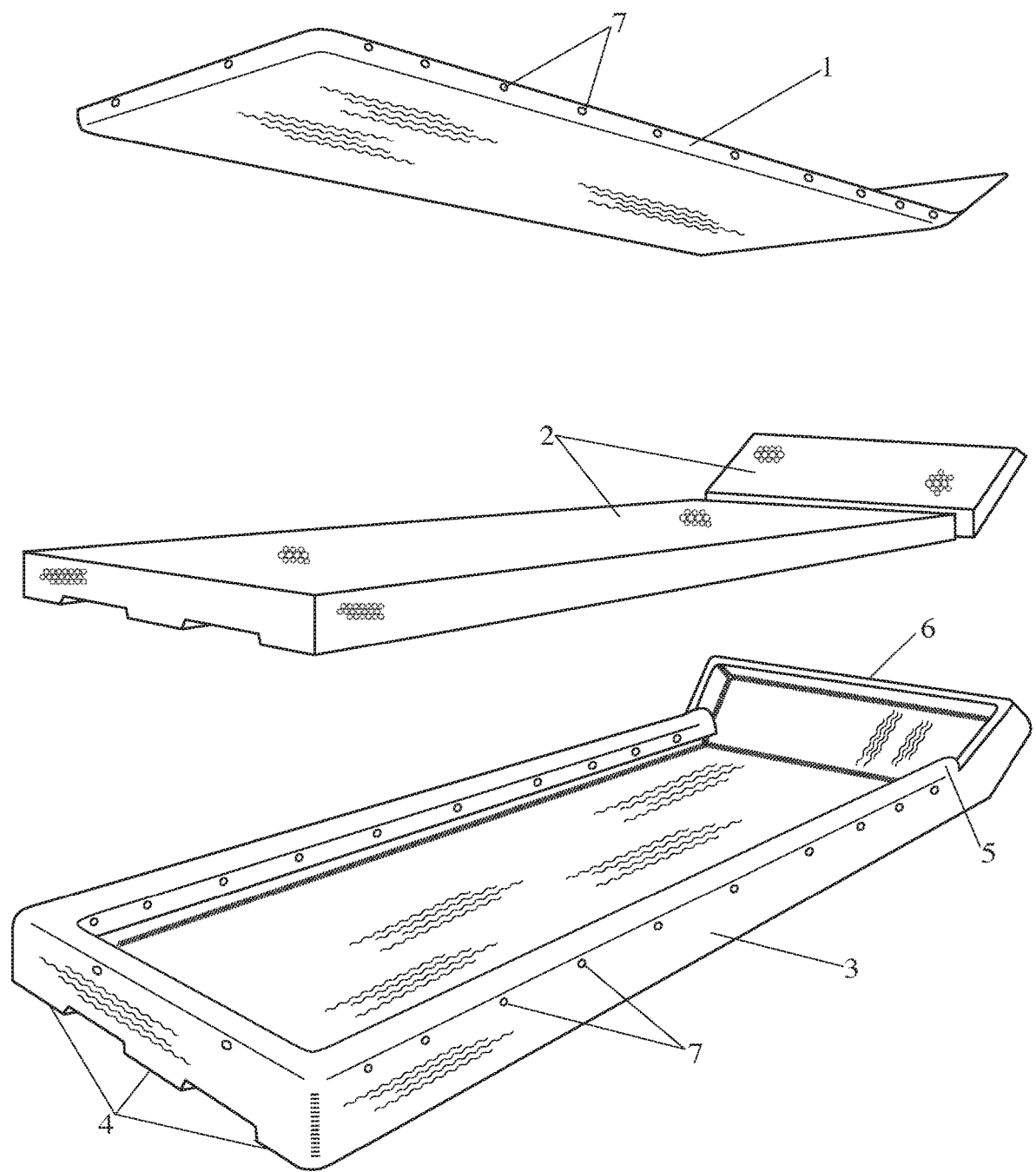
FIG. 1 SLEIGH BED exploded drawing showing three component parts:
1 The top polyethylene plastic cover 2 Central foam insulating core 3 Polyethylene plastic enveloping base.
Figure 2:
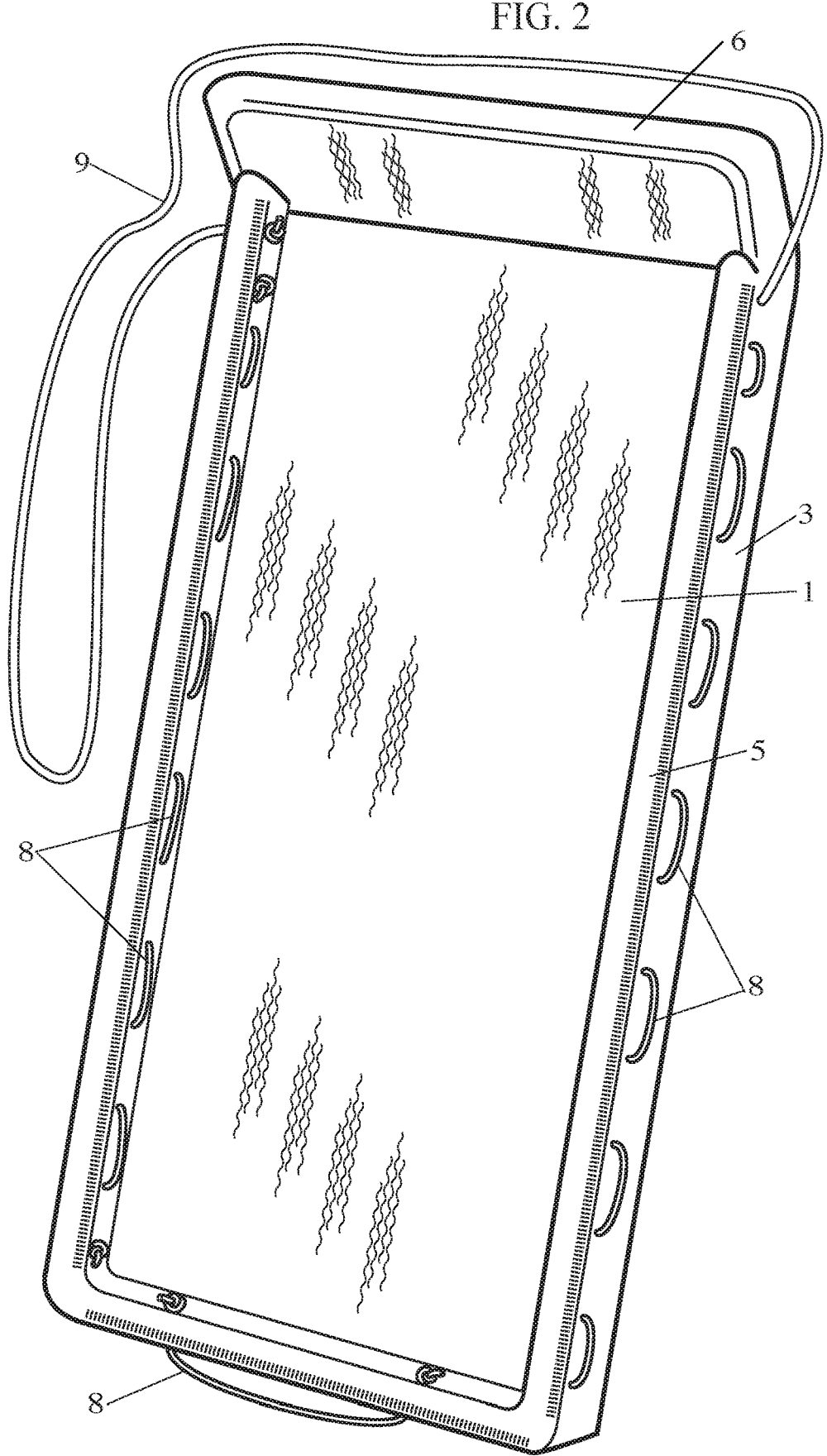
FIG. 2 SLEIGH BED assembled oblique view with rope hand holds and pull rope.

Sleigh bed in accordance with the present invention is illustrated in FIG. 1 showing three component parts. The outer skin or surface panels may consist of molded polyethylene plastic, laminates of fiberglass, vinyl plastic or laminates of wood. The top or upper flat surface panel 1 with edges curving up at 90 degrees on three sides and the front plow edge at 45 degrees more or less. Bottom surface sled embodiment 3 with longitudinal ski runners 4 and 90 degree sides contain the floatation core material 2 and rise up to a rounded edge 5 for strength and to encompass the upper panel 1 top side edges. Holes in the top and bottom panels 7 aligned in the top edge to permit the lacing of rope handles on the three sides. Front or plow edge 6 of bottom 3 sleigh panel to raise up at a 45 degree angle more or less to a top edge rounded over to cover the top skin panel. The outer upper and lower panel embodiments are laminated to the center core 2 of buoyant expanded polystyrene foam forming a single platform impervious to water and the elements.

FIG. 2

Sleigh Bed Assembly of expanded polystyrene insulating core has great strength when laminated to rigid top 1 and bottom 3 surface panels. The molded shape of the central core and front diagonal 6 sleigh core of expanded polystyrene are all encapsulated and laminated to the plastic outer skin surfaces. Expanded polystyrene reflects body heat. This is demonstrated by placing the hand on the surface of an expanded polystyrene sheet.

There is a feeling of warmth as body heat is reflected back to the hand. Because expanded polystyrene is a closed cell foam it does not retain moisture but has the ability to pass moisture back into the atmosphere. Expanded polystyrene is extremely buoyant: one cubic foot will float 60 pounds of weight at water level.

Polypropylene braided rope or cord 8 laced through the upper edges 5 of the sleigh bed platform are convenient handles or tethering points. This rope or cord passing in and out of the upper edge or rail 5 adds strength but does not have hard corners that may strike or injure hands in use. At the front plow end 6 of the sleigh bed a long polypropylene rope 9 is laced thru side holes to facilitate pulling the sleigh bed forward. Braided polypropylene is strong and does not lose strength when wet or in water.

FIG. 3

Sleigh bed rescue platform for injured persons illustrates an optional configuration rigid handle 11 to extend control for steering or stopping movement. Ski Patrol or rescue persons holding the rigid handle would be able to direct or stop the sleigh bed in difficult terrain while other rescue persons with ropes attached behind would guide and reduce decent from behind. The tubular rigid metal handle 11 would swivel 180 degrees more or less on the steel plate 10 bolted through the top edge holes 7 of the sleigh bed platform.

The invention claimed is:

1. A sleigh bed of size to accommodate a reclining person for transport or rescue, the sleigh bed comprising: a first element, the first element being a rectangular plastic bottom element constructed from high density plastic, the first element including three parallel runners, wherein two runners are located on longer outside edges of the first element and one runner is located in the middle of the first element, wherein a width of the end of the first element is turned up at a forty-five degree angle to accommodate forward movement over snow; a second element filling the rectangular plastic bottom, the second element being constructed from polystyrene foam; a third element being a rectangular cover or top piece to encapsulate the foam center core forming a ridged insulated platform, the third element being constructed from high density plastic; wherein a plurality of commonly spaced holes are located in side walls of the first element, and a matching set of commonly spaced holes are located in side walls of the third element, and wherein ropes are laced through the commonly spaced holes in the first element and the matching holes in the third element to retain the second element therebetween; and an auxiliary rigid steel handle bolted to the end of the first element, wherein the auxiliary handle swivels 180 degrees, from a forward direction of the sleigh bed to a rear direction of the sleigh bed, capable of being connected to a rear hitch on a vehicle, the swiveling of the auxiliary handle facilitates up and down movement of the sleigh bed when being pulled over terrain and keeps the sleigh bed a fixed distance from the vehicle.

2. A sleigh bed as in claim 1, wherein the ropes are laced through the first and third elements such that they form multiple hand holds on three sides of the perimeter of the sleigh bed, wherein the hand holds are facing both inboard and outboard.

* * * * *